US012809706B2

(12) United States Patent
Li et al.

(10) Patent No.: US 12,809,706 B2
(45) Date of Patent: Nov. 24, 2026

(54) PROCESSING METHOD FOR REPORTING HARDWARE FAULT AND RELATED DEVICE

(71) Applicant: xFusion Digital Technologies Co., Ltd., Zhengzhou (CN)

(72) Inventors: Sheng Li, Zhengzhou (CN); Guangbiao Zhang, Zhengzhou (CN)

(73) Assignee: XFUSION DIGITAL TECHNOLOGIES CO., LTD., Zhengzhou (CN)

( * ) Notice: Subject to any disclaimer, the term of this patent is extended or adjusted under 35 U.S.C. 154(b) by 0 days.

(21) Appl. No.: 19/012,492

(22) Filed: Jan. 7, 2025

(65) Prior Publication Data

US 2025/0147833 A1 May 8, 2025

Related U.S. Application Data

(63) Continuation of application No. PCT/CN2023/104312, filed on Jun. 29, 2023.

(30) Foreign Application Priority Data

Sep. 28, 2022 (CN) ......................... 202211192364.5

(51) Int. Cl.
*G06F 11/07* (2006.01)

(52) U.S. Cl.
CPC ........ *G06F 11/0772* (2013.01); *G06F 11/076* (2013.01)

(58) Field of Classification Search
CPC ........................... G06F 11/0772; G06F 11/076
See application file for complete search history.

(56) References Cited

U.S. PATENT DOCUMENTS

2019/0310908 A1* 10/2019 Huang ................ G06F 11/0709
2021/0117257 A1* 4/2021 Hoang ................ G06F 11/0772
2025/0238298 A1* 7/2025 Guo .................... G06F 11/0727

FOREIGN PATENT DOCUMENTS

CN 110674005 A 1/2020
CN 111008091 A 4/2020
CN 111104238 A 5/2020
CN 112306732 A * 2/2021 .......... G06F 11/0766
CN 114911659 A 8/2022
JP 2008027284 A 2/2008

OTHER PUBLICATIONS

Extended European Search Report for the corresponding EP application No. 23869837.7, issued on Sep. 17, 2025.

* cited by examiner

*Primary Examiner* — Philip Guyton
*Assistant Examiner* — Xinyuan Yu
(74) *Attorney, Agent, or Firm* — WOMBLE BOND DICKINSON (US) LLP

(57) ABSTRACT

A computing device obtains at least a first threshold and a second threshold by using an algorithm of an independent processing unit, where the first threshold and the second threshold are stored in the independent processing unit; determines, based on the first threshold, that consecutive correctable errors CEs occur; counts a quantity of consecutive CEs; and then stops reporting of a CE interruption based on the quantity of consecutive CEs and the second threshold, where the CE interruption is used to advertise occurrence of the CE.

11 Claims, 4 Drawing Sheets

PROCESSING METHOD FOR REPORTING HARDWARE FAULT AND RELATED DEVICE

CROSS-REFERENCE TO RELATED APPLICATIONS

This application is a continuation of International Application No. PCT/CN2023/104312, filed on Jun. 29, 2023, which claims priority to Chinese Patent Application No. 202211192364.5, filed on Sep. 28, 2022. The disclosures of the aforementioned applications are hereby incorporated by reference in their entireties.

TECHNICAL FIELD

Embodiments of this application relate to the hardware field, and in particular, to a processing method for reporting a hardware fault and a related device.

BACKGROUND

When a correctable error (CE) occurs on a hardware component of a current computing device, hardware repairs the error and sends an interruption to a basic input output system (BIOS), to notify the BIOS that a CE fault occurs.

However, when a large quantity of CE faults occur in a specific period of time, excessive interruptions affect normal running of a service of an operating system (OS).

SUMMARY

Embodiments of this application provide a processing method for reporting a hardware fault and a related device, which are applied to the hardware field. In the method for reporting a hardware fault, impact exerted on a normal service by reporting of a fault interruption when there are excessive CE faults can be reduced as much as possible, and the method is applicable to fault diagnosis systems with different capabilities, and is applicable to a plurality of application scenarios.

According to a first aspect, a processing method for reporting a hardware fault is provided, including:

- a computing device obtains at least a first threshold and a second threshold by using an algorithm of an independent processing unit, where the first threshold and the second threshold are stored in the independent processing unit;
- the computing device determines, based on the first threshold, that consecutive correctable errors CEs occur;
- the computing device counts a quantity of consecutive CEs; and
- the computing device stops reporting of a CE interruption based on the quantity of consecutive CEs and the second threshold, where the CE interruption is used to advertise occurrence of the CE.

In this embodiment of this application, the computing device obtains the first threshold and the second threshold by using the algorithm of the independent processing unit, so that real-time modification of each piece of threshold data can be supported; and in addition, continuous reporting of the CE interruption is stopped based on each piece of threshold data, so that impact exerted on a normal service by reporting of a fault interruption when there are excessive CE faults can be reduced as much as possible, running of the normal service is ensured, and in addition, application to more application environments can be supported, and a scope of application of this solution is expanded.

In one embodiment, the computing device obtains a third threshold by using the algorithm of the independent processing unit, and the third threshold is stored in the independent processing unit.

In addition, after the computing device stops reporting of the CE interruption based on the quantity of consecutive CEs and the second threshold, the computing device resumes reporting of the CE interruption based on the third threshold and duration for which reporting of the CE interruption is stopped.

In this embodiment of this application, the independent processing unit further obtains the third threshold, and can resume reporting of the CE interruption based on the third threshold, so that fault data can be continuously provided, and a fault status of a hardware structure of the computing device can be continuously managed.

In one embodiment, the computing device determines the first threshold and the second threshold in real time based on an occupation rate of a central processing unit (CPU) by using the algorithm of the independent processing unit, and the computing device determines the third threshold based on a capability requirement of a fault diagnosis system by using the algorithm of the independent processing unit.

In this embodiment of this application, the independent processing unit obtains the first threshold and the second threshold that are obtained based on the occupation rate of the CPU, and determines the third threshold based on the capability requirement of the fault diagnosis system, so that the independent processing unit can adapt to an application scenario in real time, and can adapt to requirements of fault diagnosis systems with different capabilities, and flexibility of this solution is improved.

In one embodiment, the computing device obtains, from an interface by using the algorithm of the independent processing unit, a first threshold, a second threshold, and a third threshold that are customized by a user, and the algorithm of the independent processing unit supports obtaining of data from an interface of the independent processing unit.

In this embodiment of this application, the computing device obtains, from an interface by using the algorithm of the independent processing unit, a first threshold, a second threshold, and a third threshold that are customized by a user, and the user modifies the first threshold, the second threshold, and the third threshold in real time from the interface based on a current application scenario, so that each piece of corresponding threshold data can be obtained based on an application scenario policy, and a large quantity of application scenarios are applicable.

In one embodiment, the computing device obtains a fourth threshold by using the algorithm of the independent processing unit, and the fourth threshold is stored in the independent processing unit.

After the computing device resumes reporting of the CE interruption based on the third threshold and the duration for which reporting of the CE interruption is stopped, the computing device counts a target quantity of times, where the target quantity of times is a quantity of times of resuming reporting of the CE interruption after reporting of the CE interruption is stopped; and then, the computing device permanently prohibits reporting of the CE interruption based on the target quantity of times and the fourth threshold.

In this embodiment of this application, reporting of the CE interruption is permanently prohibited, so that frequent reporting of the CE interruption by a hardware structure in which the CE fault occurs in a high probability can be effectively avoided, and the CE fault may be self-healed, thereby preventing continuous reporting of the CE interruption from affecting running of a normal service, avoiding constantly performing CE storm suppression and releasing, and reducing workload of the computing device.

In one embodiment, the computing device determines, based on the first threshold by using a BIOS, that consecutive CEs occur. Then, the computing device stops reporting of the CE interruption based on the quantity of consecutive CEs and the second threshold by using the BIOS.

In this embodiment of this application, an operation performed by the BIOS to stop reporting of the interruption is described by using an example, and this reflects reliability of this solution.

In one embodiment, the computing device determines, based on the first threshold by using a baseboard management controller (BMC) or an OS, that consecutive CEs occur.

The computing device stops reporting of the CE interruption based on the quantity of consecutive CEs and the second threshold by using the BMC or the OS.

In this embodiment of this application, reporting of the CE interruption may be further stopped by using the BMC or the OS, and this reflects flexibility of this solution.

In one embodiment, the independent processing unit is any one of the following:

an intelligent measurement unit (IMU), a management engine (ME), a BMC, or an OS. This is not specifically limited herein.

In this embodiment of this application, a plurality of possible implementations of the independent processing unit are listed, and this reflects diversity and flexibility of this solution.

According to a second aspect, a computing device is provided, including a CPU and an independent processing unit, where the CPU is configured to store a BIOS;

the independent processing unit is configured to obtain at least a first threshold and a second threshold by using an algorithm, where the first threshold and the second threshold are stored in the independent processing unit;

the BIOS is configured to determine, based on the first threshold, that consecutive correctable errors CEs occur;

the BIOS is further configured to count a quantity of consecutive CEs; and the BIOS is further configured to stop reporting of a CE interruption based on the quantity of consecutive CEs and the second threshold, where the CE interruption is used to advertise occurrence of the CE.

In this embodiment of this application, the independent processing unit obtains the first threshold and the second threshold by using the algorithm, so that real-time modification of each piece of threshold data can be supported; and in addition, the BIOS stops continuous reporting of the CE interruption based on the first threshold and the second threshold, so that impact exerted on a normal service by reporting of a fault interruption when there are excessive CE faults can be reduced as much as possible, and in addition, application to more application environments can be supported, and a scope of application of this solution is expanded.

In one embodiment, the independent processing unit is further configured to obtain a third threshold by using the algorithm, where the third threshold is stored in the independent processing unit; and the independent processing unit is further configured to resume reporting of the CE interruption based on the third threshold and duration for which reporting of the CE interruption is stopped.

In this embodiment of this application, the independent processing unit further obtains the third threshold, and can resume reporting of the CE interruption based on the third threshold, so that fault data can be continuously provided, and a fault status of a hardware structure of the computing device can be continuously managed.

In one embodiment, the independent processing unit is specifically configured to determine the first threshold and the second threshold in real time based on an occupation rate of the CPU by using the algorithm, and is specifically configured to determine the third threshold based on a capability requirement of a fault diagnosis system by using the algorithm.

In this embodiment of this application, the independent processing unit obtains the first threshold and the second threshold that are obtained based on the occupation rate of the CPU, and determines the third threshold based on the capability requirement of the fault diagnosis system, so that the independent processing unit can adapt to an application scenario in real time, and can adapt to requirements of fault diagnosis systems with different capabilities, and flexibility of this solution is improved.

In one embodiment, the independent processing unit is further configured to obtain a fourth threshold by using the algorithm, where the fourth threshold is stored in the independent processing unit; and the independent processing unit is further configured to count a target quantity of times, where the target quantity of times is a quantity of times of resuming reporting of the CE interruption after reporting of the CE interruption is stopped; and then, the independent processing unit is further configured to permanently prohibit reporting of the CE interruption based on the target quantity of times and the fourth threshold.

In this embodiment of this application, reporting of the CE interruption is permanently prohibited, so that frequent reporting of the CE interruption by a hardware structure in which the CE fault occurs in a high probability can be effectively avoided, and the CE fault may be self-healed, thereby preventing continuous reporting of the CE interruption from affecting running of a normal service, avoiding constantly performing CE storm suppression and releasing, and reducing workload of the computing device.

According to a third aspect, another computing device is provided, including a CPU, an independent processing unit, and a storage chip, where the storage chip is configured to store a BIOS, and the CPU is configured to run the BIOS;

the independent processing unit is configured to obtain at least a first threshold and a second threshold by using an algorithm, where the first threshold and the second threshold are stored in the independent processing unit;

the BIOS is configured to determine, based on the first threshold, that consecutive correctable errors CEs occur;

the BIOS is further configured to count a quantity of consecutive CEs; and the BIOS is further configured to stop reporting of a CE interruption based on the quantity of consecutive CEs and the second threshold, where the CE interruption is used to advertise occurrence of the CE.

In this embodiment of this application, the independent processing unit obtains the first threshold and the second threshold by using the algorithm, so that real-time modification of each piece of threshold data can be supported; and in addition, the BIOS stops continuous reporting of the CE interruption based on the first threshold and the second threshold, so that impact exerted on a normal service by reporting of a fault interruption when there are excessive CE faults can be reduced as much as possible, and in addition, application to more application environments can be supported, and a scope of application of this solution is expanded. In addition, the BIOS is stored on the storage chip, so that diversity of this solution is increased.

According to a fourth aspect, another computing device is provided, including a CPU, an independent processing unit, and a BMC chip;

- the independent processing unit is configured to obtain at least a first threshold and a second threshold by using an algorithm, where the first threshold and the second threshold are stored in the independent processing unit;
- the BMC chip is configured to determine, based on the first threshold, that consecutive correctable errors CEs occur;
- the BMC chip is further configured to count a quantity of consecutive CEs; and
- the BMC chip is further configured to stop reporting of a CE interruption based on the quantity of consecutive CEs and the second threshold, where the CE interruption is used to advertise occurrence of the CE.

In this embodiment of this application, the independent processing unit obtains the first threshold and the second threshold by using the algorithm, so that real-time modification of each piece of threshold data can be supported; and in addition, the BMC stops continuous reporting of the CE interruption based on the first threshold and the second threshold, so that impact exerted on a normal service by reporting of a fault interruption when there are excessive CE faults can be reduced as much as possible, and in addition, application to more application environments can be supported, a scope of application of this solution is expanded, and flexibility of this solution is reflected.

According to a fifth aspect, another computing device is provided, and may include a processor. The processor is coupled to a memory, the memory is configured to store instructions, and the processor is configured to execute the instructions in the memory, so that the computing device performs the method according to the first aspect of embodiments of this application or any possible implementation of the first aspect.

According to a sixth aspect, another computing device is provided, and includes a processor, configured to execute a computer program (or computer-executable instructions) stored in a memory. When the computer program (or the computer-executable instructions) is executed, the method according to the first aspect and the possible implementations of the first aspect is performed.

In one embodiment, the processor and the memory are integrated.

In one embodiment, the memory is located outside the computing device.

The computing device further includes a communication interface, and the communication interface is configured to communicate with another device, for example, send or receive data and/or a signal. For example, the communication interface may be a transceiver, a circuit, a bus, a module, or another type of communication interface.

According to a seventh aspect, a computer-readable storage medium is provided, and includes computer-readable instructions. When the computer-readable instructions are run on a computer, the first aspect of embodiments of this application or any possible implementation of the first aspect is implemented.

According to an eighth aspect, a computer program product is provided, and includes computer-readable instructions. When the computer-readable instructions are run on a computer, the first aspect of embodiments of this application or any possible implementation of the first aspect is implemented.

DESCRIPTION OF EMBODIMENTS

Figure 1:
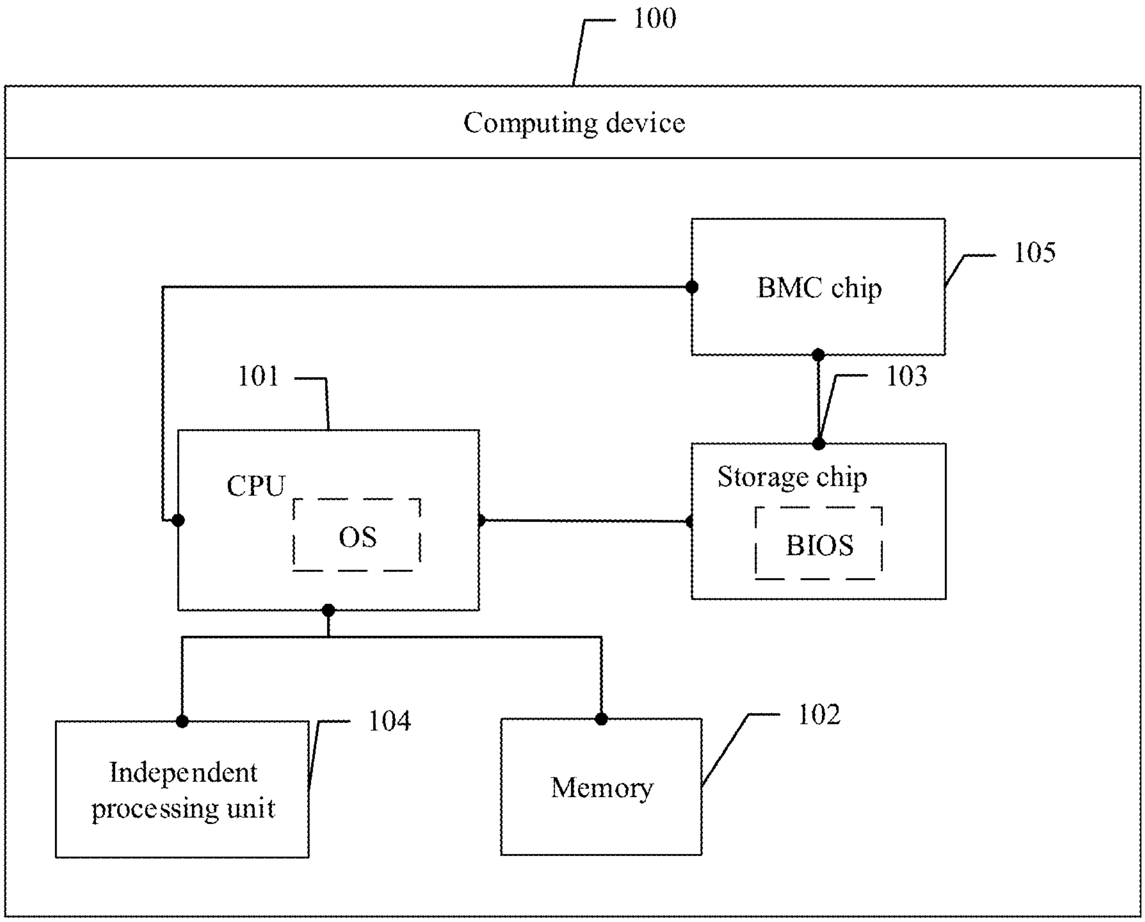
FIG. 1 is a schematic diagram of an architecture of a computing device according to an embodiment of this application.

Embodiments of this application provide a processing method for reporting a hardware fault and a related device, which are applied to the hardware field. In the processing method for reporting a hardware fault, impact exerted on a normal service by reporting of a fault interruption when there are excessive CE faults can be reduced as much as possible, and the method is applicable to fault diagnosis systems with different capabilities, and is applicable to a plurality of application scenarios.

Terms "first", "second", and the like in the specification, claims, and the foregoing accompanying drawings of this application are used to distinguish between similar objects, and do not need to be used to describe a specific sequence or order. It should be understood that terms used in this way may be exchanged in a proper case. This is merely a differentiation manner used to describe objects of a same attribute in embodiments of this application. In addition, terms "include" and "have" and any of their variations are intended to cover non-exclusive inclusion, so that a process, a method, a system, a product, or a device that includes a series of units is not necessarily limited to these units, but may include other units that are not clearly listed or that are inherent to the process, the method, the system, the product, or the device.

Embodiments of this application relate to much related knowledge about a CE fault. For better understanding of the solutions of the embodiments of this application, related terms and concepts that may be involved in the embodiments of this application are described first below.

Fault interruption: When a CE fault occurs in a hardware structure of a computing device, a signal, that is, a fault interruption, is sent to a BIOS or an OS, to notify the BIOS or the OS that the CE fault occurs in the hardware structure. After receiving the fault interruption, the BIOS perceives that the CE fault occurs in the hardware structure, and obtains related fault information of the CE fault from the hardware structure.

CE storm: indicating that a specific quantity of CE faults occur in a specific period of time.

CE storm suppression: a mechanism for processing a CE storm in a computer system. Specifically, after the CE storm occurs, a fault interruption is disabled, and reporting of the interruption to the BIOS is stopped.

CE storm suppression releasing: a mechanism for processing a CE storm in the computer system. Specifically, after the CE storm is suppressed for specific time, the fault interruption is enabled again, and when the CE fault occurs, if the fault interruption is still sent, CE storm suppression is released.

Independent processing unit: The independent processing unit is a processing unit that is independent of a main processor, such as a main CPU, is not affected by a task on the main processor, and may be configured to monitor the main processor.

Fault diagnosis system: When CE faults continuously occur in a hardware structure and are accumulated, the faults may become uncorrectable errors, and the fault diagnosis system can identify, in advance by using obtained fault information of the CE faults, a hardware structure in which the uncorrectable errors may occur, to replace the hardware structure to ensure running of a normal service of the computing device. For example, the fault diagnosis system may be an in-band OS system or a baseboard management controller (BMC) system. This is not specifically limited herein.

Before the embodiments of this application are described, a processing manner of a CE fault of a hard failure type in a current memory mirroring mode is briefly described first, to help subsequently understand the embodiments of this application.

When a CE fault occurs in a central processing unit (CPU), a memory, a peripheral component interconnect express (PCIE) device, or another hardware component in a current computing device, a hardware structure in which the fault occurs may repair the fault, and send a fault interruption to the BIOS to notify the BIOS that the CE fault occurs, and then the BIOS obtains related fault information such as a fault address or a fault status from the hardware structure in which the CE fault occurs. After the BIOS receives the fault interruption, a priority of obtaining the fault information from the hardware structure is higher than a priority of a normal service used for running of an OS. In this case, the normal service used for running of the OS is suspended. Therefore, when there are excessive CE faults, excessive fault interruptions lead to an excessively long time period in which running of a service normally run by the computing device is suspended and frequent occurrence of suspension of running. Consequently, stalling or breakdown occurs during running of a normal service, and running of the normal service is affected. Therefore, when it is found that there are excessive CE faults, reporting of the fault interruption needs to be suppressed. However, after the fault interruption is disabled, a fault diagnosis system that is used to locate and analyze the fault cannot perceive CE data, that is, CE fault information. Therefore, a hardware structure in which an uncorrectable error may occur cannot be identified by using the CE data, and a hardware structure in which the fault occurs cannot be replaced. Therefore, the fault interruption needs to be enabled again.

In some embodiments, occurrence of the CE storm and whether to perform CE storm suppression and releasing are determined by using four pieces of threshold data in the BIOS. For example, fixed values of the four pieces of threshold data in the BIOS are set to x, y, z, and w. x is a threshold of a time interval between two adjacent CE faults. To be specific, if a time interval between two CE faults is not greater than x, it is determined that the two CE faults are consecutive CE faults. y is a threshold of a quantity of consecutive CE faults. To be specific, when a time interval between two adjacent CE faults is less than or equal to x, the quantity of consecutive CE faults is continuously counted, and when a time interval between two adjacent CE faults is greater than x, the counted quantity of CE faults is set to zero. When the counted quantity of CE faults is greater than y, the BIOS determines that a CE fault storm occurs, and the BIOS performs CE storm suppression, and does not send an interruption to report the CE fault. z is a threshold of a time interval for releasing CE storm suppression. To be specific, after the time interval of CE storm suppression reaches z, the BIOS releases the CE storm suppression, and resumes sending of an interruption to report the CE fault, so that the fault diagnosis system obtains CE data.

For example, the BIOS performs storm suppression and instructs the independent processing unit to perform timing. After timing reaches z, the independent processing unit instructs the BIOS to release the suppression. w is a threshold of a quantity of times of repeatedly performing CE storm suppression and releasing. To be specific, if a quantity of times that the BIOS repeatedly performs suppression and releasing reaches w, the BIOS permanently suppresses the CE storm, and never sends an interruption to report the CE fault again. In other words, the fault diagnosis system no longer obtains CE data.

However, a plurality of pieces of threshold data in the BIOS are fixed, and the BIOS does not support modification of the threshold data. However, performance of different hardware systems and applicable application scenarios are different, and tolerance to the CE fault is also different. Therefore, related threshold data cannot be adjusted to adapt to more hardware systems. In addition, fault diagnosis systems with different capabilities cannot be adapted to. For example, when a CE data collection requirement increases after the fault diagnosis system is upgraded, and related threshold data (for example, z and w) cannot be modified, this processing mechanism does not adapt to fault diagnosis systems with different capabilities, and an application scenario is single. In addition, because a BIOS chip is coupled to an independent processing unit, if a version is to be upgraded, a manner of coupling to the independent processing unit needs to be synchronously modified, and maintenance workload is large.

To resolve the foregoing problem, embodiments of this application provide a processing method for reporting a hardware fault and a related device, which are applied to the hardware field. A computing device obtains at least a first threshold and a second threshold by using an algorithm of an independent processing unit, where the first threshold and the second threshold are stored in the independent processing unit. Then, the computing device determines, based on the first threshold, that consecutive correctable errors CEs occur, and the computing device counts a quantity of consecutive CEs, and stops reporting of a CE interruption based on the quantity of consecutive CEs and the second threshold, where the CE interruption is used to advertise the CE. The computing device obtains the first threshold and the second threshold by using the algorithm of the independent processing unit, so that real-time modification of each piece of threshold data can be supported, impact exerted on a normal service by reporting of a fault interruption when there are excessive CE faults can be reduced as much as possible, and in addition, application to more application environments can be supported, and a scope of application of this solution is expanded.

First, for example, for ease of understanding subsequent embodiments, an architecture of a computing device provided in embodiments of this application is briefly described first. For details, refer to FIG. 1. FIG. 1 is a schematic diagram of an architecture of a computing device according to an embodiment of this application. Hardware of the computing device includes:

a CPU 101, a storage chip 103, and a memory 102, where the memory 102 is configured to store data, the CPU 101 may run an OS, a BIOS is stored on the CPU 101 or the storage chip 103, and the BIOS is run by the CPU 101. In one embodiment, the computing device further includes a BMC chip 105 that stores a BMC system. When a fault occurs in a hardware composition structure of the computing device, a fault interruption is sent to the BIOS to notify the BIOS, and then the BIOS collects fault information and reports the fault information to a fault diagnosis system, that is, the OS and/or an out-of-band BMC system. Then, the OS and/or the out-of-band BMC system perform/performs fault diagnosis based on the fault information, to replace the faulty hardware structure to ensure normal running of the computing device.

Specifically, the BIOS may collect a fault log from the fault that occurs in the hardware structure of the computing device, and perform CE storm determining/suppression/releasing. The OS mainly includes running of a main service and process, and can also be used as a fault diagnosis system to obtain fault information from the BIOS for fault analysis and fault diagnosis. A BMC can be used as an out-of-band fault diagnosis system to obtain fault information from the BIOS for fault analysis and fault diagnosis. In one embodiment, the BMC can further implement CE storm control.

For example, when a CE fault occurs in the hardware composition structure of the computing device such as a CPU, a memory, or a PCIE device, the hardware structure with the CE fault may be repaired by the hardware structure, and the hardware structure sends a CE interruption, that is, a fault interruption, to notify the BIOS that the CE fault occurs. The CE interruption is an interruption used to notify the hardware structure of the CE fault, and the BIOS obtains fault information based on the CE interruption, and reports fault information to the OS or the BMC for performing an operation such as fault diagnosis.

In one embodiment, when a CE fault occurs in the hardware structure of the computing device, the hardware structure may send a CE interruption to the OS, to notify the OS that the CE fault occurs in the hardware structure, where the OS has a CE interruption obtaining function of the BIOS.

In one embodiment, when a CE fault occurs in the hardware structure of the computing device, the hardware structure may further send a CE interruption to the BMC, to notify the BMC that the CE fault occurs in the hardware structure, where the BMC also has the CE interruption obtaining function of the BIOS.

The computing device further includes an independent processing unit 104. The independent processing unit 104 is configured to obtain threshold data such as a first threshold, a second threshold, a third threshold, and/or a fourth threshold corresponding to a scenario policy. In one embodiment, the independent processing unit 104 may obtain each piece of threshold data based on an occupation rate of the CPU and a capability or a requirement of the fault diagnosis system for obtaining fault information, or the independent processing unit 104 may obtain each piece of threshold data defined by a user based on the scenario policy. Details are specifically shown in the following method embodiments, and the details are not described herein again.

Specifically, after receiving the CE interruption, the BIOS running on the CPU 101 obtains the first threshold and the second threshold from the independent processing unit 104, determines, based on the first threshold, whether consecutive CE faults occur, counts a quantity of consecutive CE faults, determines, when the quantity reaches the second threshold, that a CE storm occurs, and stops reporting of a CE interruption. The independent processing unit 104 is further configured to resume reporting of the CE interruption based on the third threshold and duration for which reporting of the CE interruption is stopped.

In an embodiment of this application, each piece of threshold data is obtained by the independent processing unit. When the CE fault occurs in the hardware structure, after receiving the CE interruption, the BIOS obtains the first threshold and the second threshold from the independent processing unit. When the quantity of consecutive CE faults reaches the second threshold, the BIOS determines that a CE storm occurs, stops reporting of the CE interruption, and performs CE storm suppression. When the BIOS stops reporting of the CE interruption, the BIOS instructs the independent processing unit to perform timing on a time period in which reporting of the CE interruption is stopped. When the quantity of consecutive CE faults reaches the third threshold, the BIOS releases CE storm suppression, that is, enables reporting of the CE interruption. Therefore, when it is determined that the CE storm occurs, CE storm suppression can prevent reporting of excessive CE interruptions from affecting a normal service running in the OS, and prevent stalling or breakdown of the normal service running in the OS, so that the normal service running in the OS runs normally. In addition, each piece of threshold data is dynamically obtained by the independent processing unit in real time based on the scenario policy, and can adapt in real time to transformation of an application scenario, so that more application scenarios are applicable.

It should be noted that the computing device shown in FIG. 1 may be a computing device such as a server, a personal computer, a computer, a cluster server, a vehicle-mounted computing device, a tablet, or a storage system. It may be understood that in an actual application scenario, the computing device may alternatively be another computing device. This is not specifically limited herein.

Figure 2:
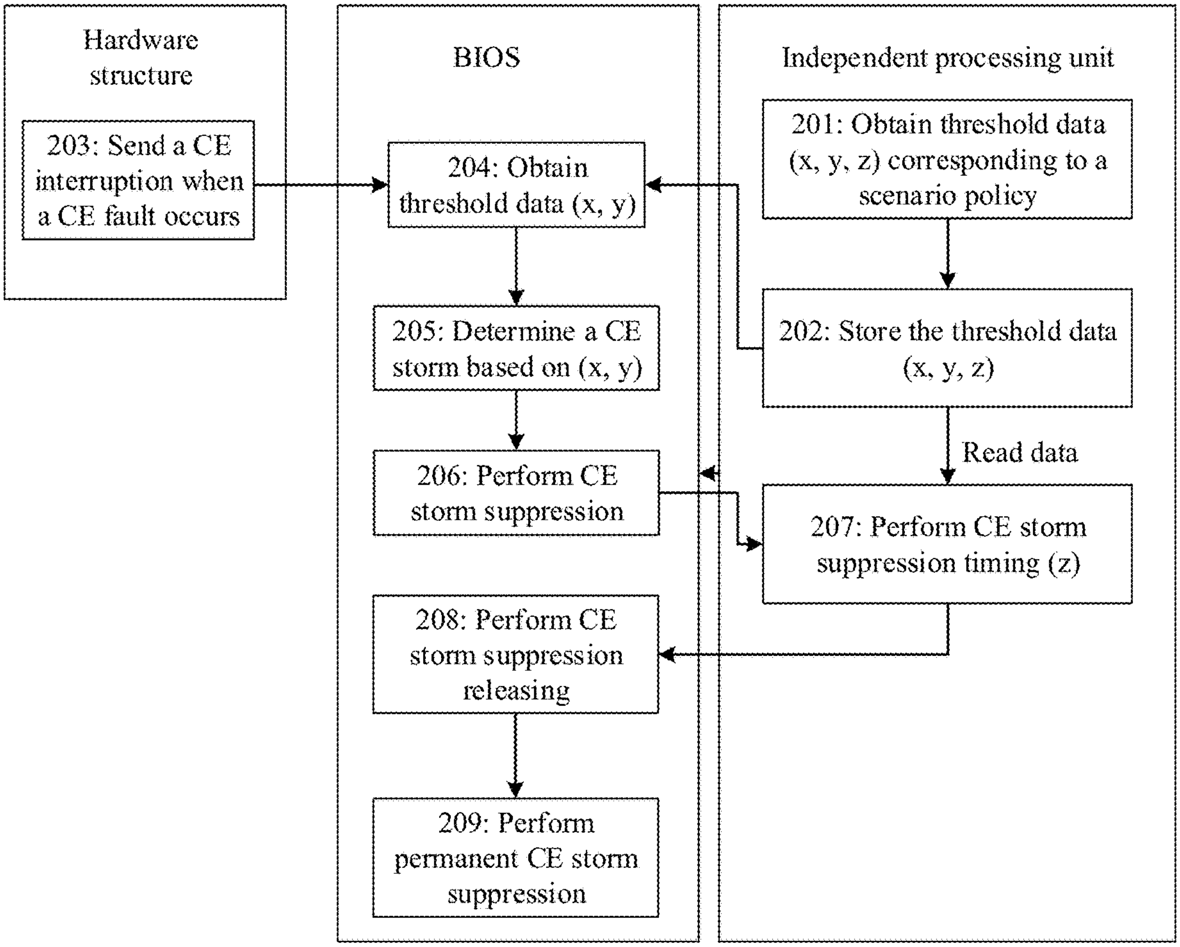
FIG. 2 is a schematic diagram of a processing method for reporting a hardware fault according to an embodiment of this application.

Based on the foregoing example of the computing device in FIG. 1, for better understanding of the embodiments of this application, a processing method for reporting a hardware fault provided in the embodiments of this application is described in detail below with reference to the accompanying drawings. A person of ordinary skill in the art may learn that, with the development of technologies and emergence of a new scenario, the technical solutions provided in the embodiments of this application are also applicable to a similar technical problem. For details, refer to FIG. 2. FIG. 2 is a schematic diagram of a processing method for reporting a hardware fault according to an embodiment of this application. The method specifically includes the following operations.

201: An independent processing unit obtains threshold data (x, y, z) corresponding to a scenario policy.

Corresponding threshold data (x, y, z) varies with an application scenario or a capability of a fault diagnosis system in a current application scenario, where x is a threshold of a time interval between two adjacent CE faults, y is a threshold of a quantity of consecutive CE faults, and z is a threshold of a time interval for releasing CE storm suppression. Details are similar to those described above, and are not described herein again. For example, when the fault diagnosis system needs to obtain a large amount of CE fault information or a hardware structure has a strong capability, a value of y may be increased within a specific range; or when service strength of a current computing device is high, that is, an occupation rate is high, excessive CE interruptions may affect running of a normal service, and a value of y may be appropriately decreased. This is not specifically limited herein.

In one embodiment, the independent processing unit may be implemented by software of the computing device. For example, the BMC shown in FIG. 1 may be used as the independent processing unit to obtain the threshold data (x, y, z) corresponding to the scenario policy. The threshold data (x, y, z) may be modified by a user in real time based on a current application scenario, or the threshold data (x, y, z) is dynamically adjusted by an algorithm based on a device parameter of the current computing device. This is not specifically limited herein. When each piece of corresponding threshold data is obtained in real time based on an application scenario policy, a large quantity of application scenarios are applicable. In addition, an implementation of specifically obtaining the threshold data (x, y, z) is described in a subsequent example. Details are not described herein again.

In one embodiment, the independent processing unit further obtains threshold data w corresponding to the scenario policy, where w is a permanent suppression flag. For example, when a CE fault storm frequently occurs in a hardware structure, and storm suppression and storm suppression releasing are performed for a plurality of times, when a quantity of storm suppression releasing times meets w, the permanent suppression flag w is triggered to be valid. In this case, after the CE storm is generated again, and the CE storm is suppressed, a CE storm suppression release task is not delivered, and the CE storm suppression is permanently effective. The independent processing unit further obtains the threshold data w, so that CE storm suppression can be permanently effective based on the threshold data w. When a hardware structure in which a CE fault occurs does not affect a normal service of the computing device, the threshold data w is used to permanently suppress a CE interruption that is reported to more effectively isolate the hardware structure, thereby completely avoiding impact exerted on a normal service by continuously reported CE interruptions, so that a service in an OS runs normally.

In addition, for example, when a specific hardware structure is relatively important, a status of the hardware structure needs to be paid attention to in real time. Therefore, the hardware structure does not need to be permanently suppressed, and a value of w may be adjusted to as large as possible, for example, to infinity, or when a CE fault of a specific hardware structure does not exert much impact on the computing device in a current application scenario, permanent suppression can also be implemented, to prevent excessive CE interruptions from affecting running of a normal service of the computing device.

In addition, in one embodiment, for example, as shown in FIG. 1, the independent processing unit of the computing device may be an intelligent measurement unit (IMU) or a management engine (ME). It may be understood that the independent processing unit may alternatively be another hardware structure. This is not specifically limited herein. An independent processing unit implemented by hardware may obtain, based on a data serial port of the independent processing unit, threshold data (x, y, z) entered by the user, or obtain, based on an internal algorithm of the independent processing unit, threshold data (x, y, z) corresponding to the computing device in the current application scenario.

For example, the independent processing unit dynamically adjusts the threshold data (x, y) based on an occupation rate of a CPU. For example, when the occupation rate of the CPU is 50%, x is fixed as 60 seconds, and y is fixed as 10 times. Each time the occupation rate is increased by 10%, the independent processing unit adjusts x=x*2 and y=y/2. Each time the occupation rate is decreased by 10%, the independent processing unit adjusts x=x/2 and y=y*2. Specifically, for example, when the occupation rate of the CPU is decreased to 40%, current x=60 seconds/2=30 seconds, and y=10*2=20 times, that is, the independent processing unit dynamically adjusts the threshold data x to 30 seconds and y to 10 times based on the occupation rate of the CPU. Alternatively, when the occupation rate of the CPU is increased from 50% to 60%, current x=60 seconds*2=120 seconds, and y=10/2=5 times, that is, the independent processing unit dynamically adjusts the threshold data x to 120 seconds and y to 5 times based on the occupation rate of the CPU.

In an embodiment of this application, the independent processing unit obtains the corresponding threshold data (x, y) obtained based on the occupation rate of the CPU, and the independent processing unit can dynamically and automatically generate threshold data (x, y) corresponding to the current application scenario in real time, to adapt to the application scenario in real time and improve flexibility of this solution.

In addition, in one embodiment, the independent processing unit may further dynamically adjust the threshold data (z, w) based on a fault prediction capability of a fault diagnosis system. For example, after the fault diagnosis system is upgraded or updated, a requirement of the fault diagnosis system for fault information changes, and the independent processing unit determines the threshold data (z, w) based on a current requirement of the fault diagnosis system for the fault information. For example, if a capability of the fault diagnosis system remains unchanged, the computing device starts a first running hour, z=10 minutes and w=30 times, and each time one hour passes, z=z*2, that is, in a second hour, z=20 minutes, and so on as time elapses. If a CE fault interruption is not received in three days, z is restored to 10 minutes, and w is restored to 30 times. When the capability of the fault diagnosis system is upgraded and more CE fault information needs to be obtained, the independent processing unit adjusts the threshold data (z, w) based on the fault prediction capability of the fault diagnosis system. For example, the computing device starts a first running hour, z is fixed to 10 minutes, and w is fixed to infinity, and each time one hour passes, z=z*2. If a CE fault interruption is not received in three days, z is restored to 10 minutes, and w is restored to infinity.

In one embodiment of this application, the independent processing unit dynamically adjusts the threshold data (z, w) based on a fault threshold capability of the fault diagnosis system, to adapt to requirements of fault diagnosis systems with different capabilities, for example, to support the fault diagnosis system to obtain more fault information.

In addition, the independent processing unit obtains the threshold data (x, y, z), and stores the threshold data in a storage area of the independent processing unit. This is specifically shown in operation 202.

202: Store the threshold data (x, y, z).

The independent processing unit obtains the threshold data (x, y, z) and stores the threshold data in the storage area of the independent processing unit. The threshold data (x, y, z) may be read from the storage area of the independent processing unit to implement a subsequent operation.

When a CE fault occurs in a hardware structure of the computing device, a BIOS, a BMC, or an OS of the computing device may obtain the threshold data (x, y, z) from the independent processing unit to determine whether a CE storm occurs, perform CE storm suppression when determining that the CE storm occurs, and perform CE storm suppression releasing. This is specifically described in the following operations:

203: Send a CE interruption when a CE fault occurs in the hardware structure.

The CE fault occurs in the hardware structure of the computing device. In this case, the hardware structure sends the CE interruption to the BIOS, so that the BIOS perceives that the CE fault occurs in the hardware structure.

In one embodiment, the hardware structure may further send the CE interruption to the OS or the BMC, to notify the OS or the BMC that the CE fault occurs in the hardware structure. The OS or the BMC supports obtaining of the CE interruption and modification of an enabled/disabled state of the CE interruption.

After receiving the CE interruption, the BIOS determines, based on the CE interruption, whether a CE storm occurs, and takes corresponding measures. For details, refer to the following operations 204 to 208.

204: The BIOS obtains threshold data (x, y).

The BIOS obtains the threshold data (x, y) from the independent processing unit.

Specifically, the BIOS may obtain the threshold data (x, y) from the storage area of the independent processing unit.

205: The BIOS determines a CE storm based on (x, y).

Specifically, when a time interval of receiving two CE interruptions by the BIOS is not greater than x, it is determined that the two CE interruptions are consecutive CE interruptions, and a quantity of consecutive CE interruptions is recorded. When the quantity of consecutive CE interruptions reaches y, it is determined that the CE storm occurs. When the quantity of consecutive CE interruptions is less than y, it is determined that no CE storm occurs. In a period in which the quantity of consecutive CE interruptions does not reach y, if a time interval between two CE interruptions is greater than x, the recorded quantity of consecutive CE interruptions is set to zero.

206: The BIOS performs CE storm suppression.

After determining that the CE storm occurs, the BIOS performs CE storm suppression.

For example, after determining that the CE storm occurs, the BIOS disables the reporting of the CE interruption, and prohibits the hardware structure of the computing device from sending the CE interruption to the BIOS, to prevent continuous reporting of the CE interruption from affecting running of a normal service.

In addition, when the BIOS performs CE storm suppression, the BIOS further notifies the independent processing unit of execution of the CE storm suppression, so that the independent processing unit performs storm suppression timing based on the threshold data z. This is specifically shown in operation 207.

207: The independent processing unit performs CE storm suppression timing.

When the independent processing unit performs CE storm suppression on the BIOS, the independent processing unit obtains the threshold data z, and performs storm releasing timing. For example, the independent processing unit may perform counting by progressively decreasing z. When z is progressively decreased to 0, the independent processing unit sends a CE storm suppression release task to the BIOS; or the independent processing unit may start timing, and when a timing value reaches the threshold data z, the independent processing unit sends a CE storm suppression release task to the BIOS. It may be understood that, in an actual case, an embodiment in which the independent processing unit performs CE storm suppression timing based on the threshold data z may alternatively be another embodiment. This is not specifically limited herein.

In an embodiment of this application, the independent processing unit performs CE storm suppression releasing timing based on the threshold data z, so that CE storm suppression can be effectively released, reporting of the CE interruption is restored, and therefore, the BIOS can resume obtaining of fault information, and real-time management of a fault of the computing device is ensured as much as possible.

208: The BIOS releases CE storm suppression.

When the independent processing unit determines, based on the threshold data z, that duration of performing the CE storm suppression reaches the threshold z, the BIOS receives the CE storm suppression release task delivered by the independent processing unit, and performs CE storm suppression releasing. After the suppression is released, when a CE fault occurs, the hardware structure can still send the CE interruption to the BIOS to notify the BIOS that the CE fault occurs, so that a corresponding operation can be subsequently normally performed based on the CE interruption, for example, obtaining CE fault information, and the fault diagnosis system performs diagnosis, locating, analysis, and the like on the CE fault based on the CE fault information.

In one embodiment, when a quantity of times the BIOS performs CE storm suppression releasing reaches the threshold data w, the BIOS performs permanent CE storm suppression. This is specifically shown in operation 209.

209: The BIOS performs permanent CE storm suppression.

Specifically, the independent processing unit counts a quantity of times that the BIOS performs CE storm suppression releasing. When a counting value reaches the threshold data w, a permanent suppression flag w is valid, and the independent processing unit does not deliver the CE storm suppression release task to the BIOS, thereby implementing permanent CE storm suppression.

In one embodiment of this application, permanent CE storm suppression is performed, so that a hardware structure in which the CE fault occurs in a high probability can be effectively prevented from frequently reporting the CE interruption, and the CE fault can be self-healed, thereby preventing continuous reporting of the CE interruption from affecting running of a normal service, preventing constantly performing CE storm suppression and releasing, and reducing workload of the computing device.

It should be noted that FIG. 2 is merely used as an example for understanding of the embodiments of this application, and does not constitute a substantial limitation on this solution. It may be understood that an operation performed by the BIOS in FIG. 2 in this solution may also be performed by an OS or a BMC. For example, the OS or the BMC supports obtaining of the CE interruption, and supports modification of an enabled/disabled state of the reporting of the CE interruption, or may be implemented in another manner. This is not specifically limited herein.

In this embodiment of this application, CE fault storm suppression and suppression releasing are performed by using the threshold data obtained by the independent processing unit, and the threshold can be changed in real time based on an application environment. This is applicable to a large quantity of application scenarios. In addition, the threshold data can be adaptively modified to improve flexibility of this solution, and this is applicable to fault diagnosis systems with different working capabilities.

Figure 3:
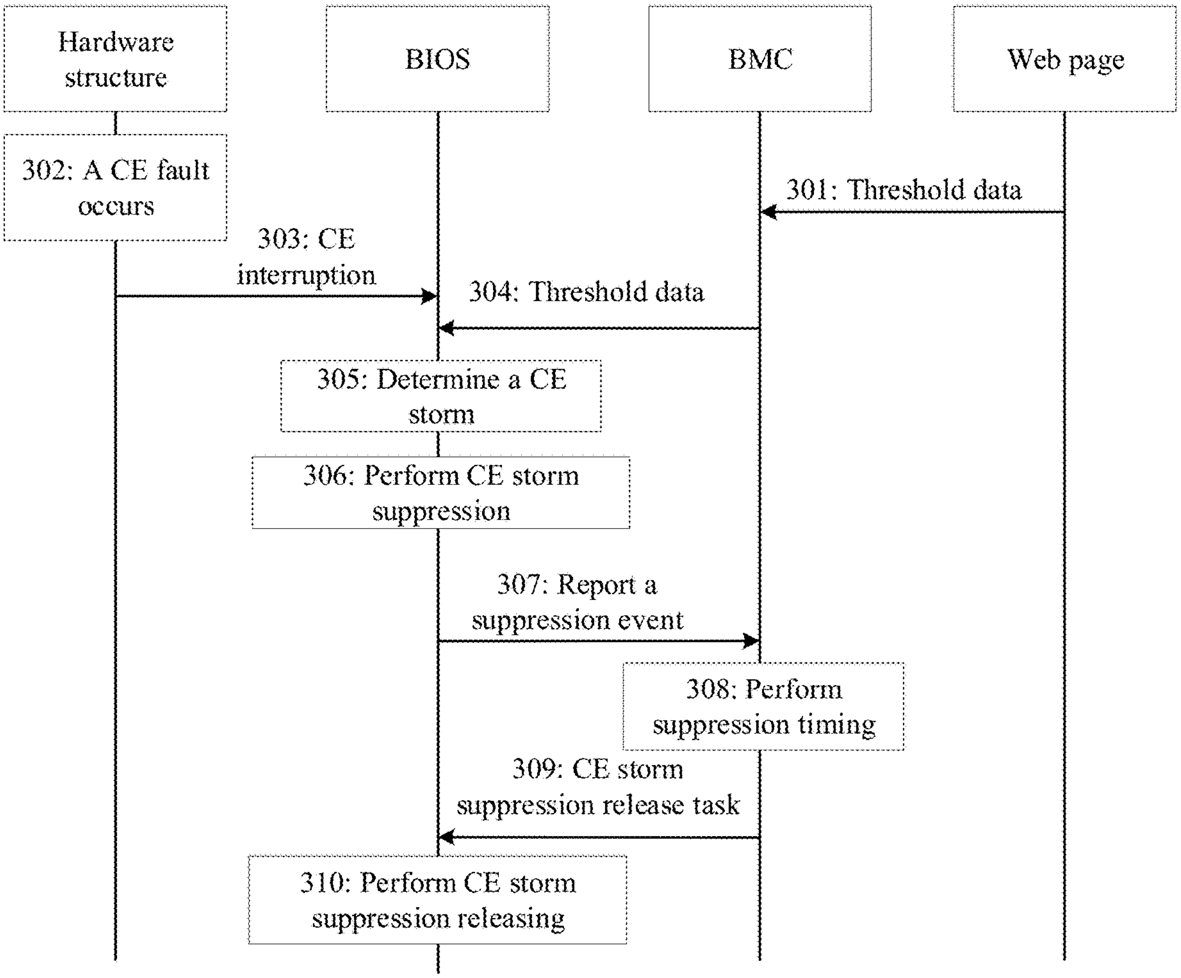
FIG. 3 is a schematic diagram of an application scenario according to an embodiment of this application.

To facilitate understanding of the embodiments of this application, examples of two application scenarios are described below. First, for details, refer to FIG. 3. FIG. 3 is a schematic diagram of an application scenario according to an embodiment of this application.

A server that carries an X86 CPU is used as an example of the computing device for description. Because there is no independent processing unit independent of a main CPU in the X86 CPU, in FIG. 3, a BMC is used as an independent processing unit to perform operations such as obtaining threshold data and performing CE storm suppression timing. In addition, based on out-of-band management of the BMC, a user may modify the threshold data based on out-of-band interaction, and the BIOS reads the threshold data from the BMC to determine a CE storm and perform operations such as CE storm suppression and releasing. A specific implementation process is as follows:

301: The BMC obtains threshold data by using a web page.

For example, the user may input threshold data (x, y, z, and/or w) in the BMC based on out-of-band interaction by using the web page, that is, an input interface or an input program. A specific value of the threshold data (x, y, z, and/or w) may be modified by the user in real time based on an application environment. This is not specifically limited herein. Specifically, in an embodiment of this application, the user may adjust the threshold data based on tolerance of a system of the computing device to the CE storm, or the BMC dynamically adjusts the threshold data based on a change in a requirement of a fault diagnosis system (that is, the BMC or an OS) for obtaining CE fault information, so that this solution is applicable to a plurality of application scenarios. Specific implementation is similar to that described in FIG. 2, and details are not described herein again.

302: A CE fault occurs in a hardware structure.

When the hardware structure detects that the CE fault occurs in the hardware structure, the hardware structure repairs the CE fault, and performs the following operation 303 to send a CE interruption to the BIOS.

303: The hardware structure sends a CE interruption to the BIOS.

When the hardware structure detects that the CE interruption occurs in the hardware structure, the hardware structure sends the CE interruption to the BIOS, so that the BIOS perceives that the CE fault occurs.

304: The BIOS obtains threshold data from the BMC.

The BIOS reads threshold data (x, y) from the BMC, and then performs operation 305 based on the threshold data to determine a CE storm.

305: The BIOS determines a CE storm.

For example, the BIOS determines the CE storm based on the read threshold data (x, y). Specifically, when a time interval of reporting two adjacent CE interruptions is less than x, it is determined that the two CE interruptions are consecutive CE interruptions, and the consecutive CE interruptions are counted. When a time interval between two adjacent CE interruptions is greater than x, a quantity of consecutive CE interruptions is set to zero. When a counting value of consecutive CE interruptions reaches the threshold data y, it is determined that the CE storm is currently generated. The BIOS performs the following operation 306 to perform CE storm suppression.

306: The BIOS performs CE storm suppression.

When the BIOS determines that the CE storm occurs in a current state, the BIOS performs CE storm suppression. Specifically, the BIOS disables the reporting of the CE interruption, and prohibits reporting of the CE interruption, thereby preventing continuous reporting of the CE interruption from affecting running of a normal service, and preventing continuous reporting of the CE interruption from causing stalling or breakdown of running of the normal service.

307: The BIOS reports a suppression event to the BMC.

Specifically, when performing CE storm suppression, the BIOS further reports start of the CE storm suppression to the BMC, so that the BMC performs the following operation 308:

308: The BMC performs suppression timing.

Specifically, after the BMC receives the suppression event reported by the BIOS, the BMC obtains the threshold data z, and starts to perform suppression timing. For example, the BMC may perform counting by progressively decreasing z, and when z is progressively decreased to 0, operation 309 is performed. Alternatively, timing starts from 0, and operation 309 is performed when timing reaches the threshold data z. This is not specifically limited herein.

309: The BMC delivers a CE storm suppression release task.

Specifically, when timing meets a condition of the threshold data z, the BMC delivers the CE storm suppression release task to the BIOS.

310: The BIOS performs CE storm suppression releasing.

After receiving the CE storm suppression release task delivered by the BMC, the BIOS performs CE storm suppression releasing. For example, the BIOS enables the reporting of the CE interruption. When the CE fault occurs, the BIOS normally receives the CE interruption reported by the hardware structure, and perceives that the CE fault occurs, or further obtains CE fault information and sends the CE fault information to the fault diagnosis system.

In one embodiment, the BMC obtains the threshold data w from the user, and when a quantity of times the BMC delivers CE storm suppression releasing reaches the threshold data w, the threshold data w, that is, a permanent suppression flag, is triggered to be valid. Specifically, the BIOS implements permanent CE storm suppression, that is, subsequently, does not enables the reporting of the CE interruption again, and never obtains the CE interruption again. Further, workload of the computing device can be reduced, and CE storm suppression and CE storm suppression releasing are prevented from being performed in a high probability.

It should be noted that, that the BMC is used as the independent processing unit in FIG. 3 is an example for implementing the independent processing unit in a software form to describe a specific implementation of the independent processing unit. This is merely used as an example for understanding the embodiments of this application, and does not constitute a substantial limitation on the embodiments of this application. It may be understood that in an actual case, another software may alternatively be used to implement the independent processing unit. This is not specifically limited herein.

Figure 4:
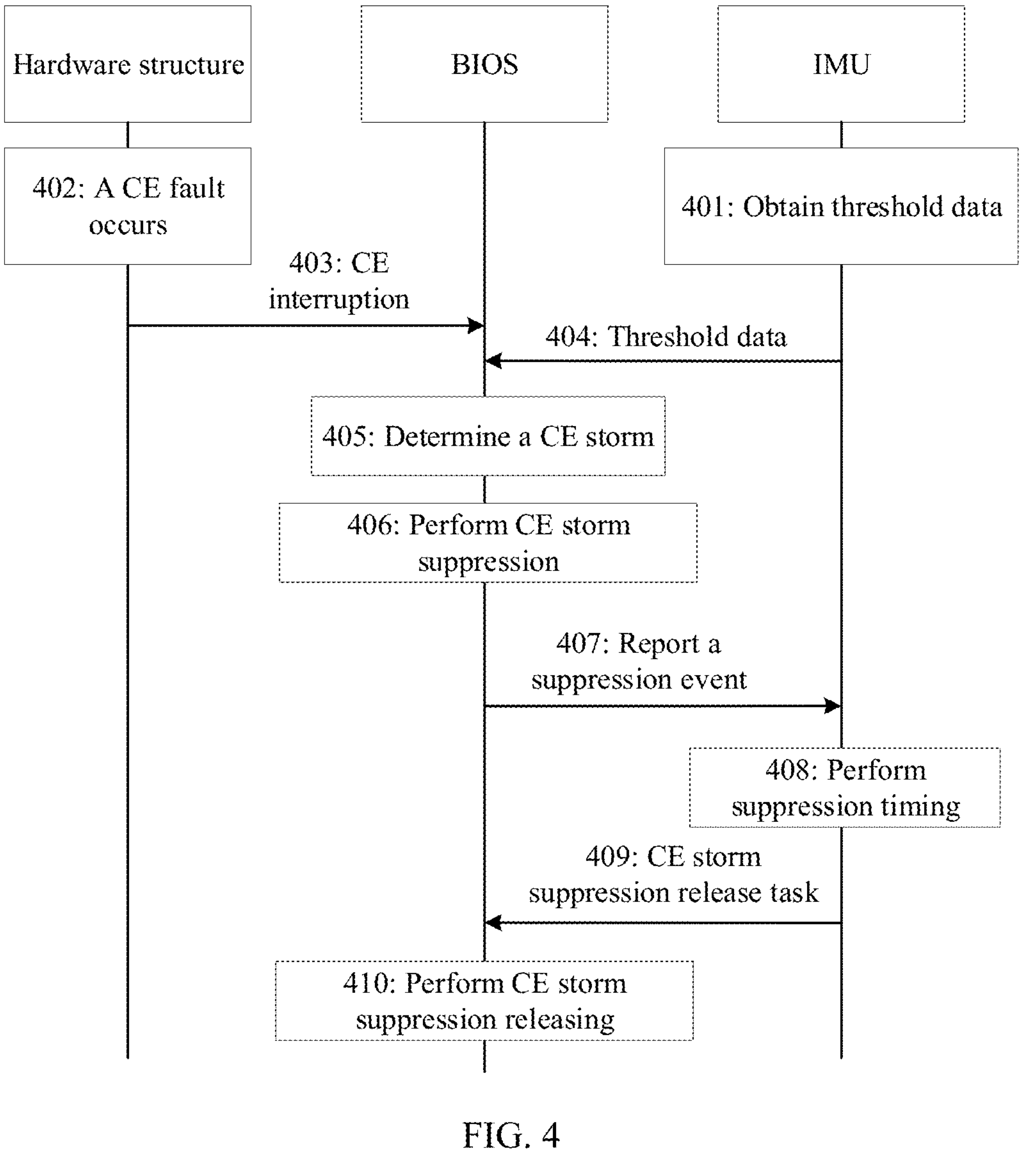
FIG. 4 is another schematic diagram of an application scenario according to an embodiment of this application.

An application scenario in which the software BMC is used as the independent processing unit is described above in FIG. 3. An application scenario in which a hardware IMU is used as the independent processing unit is used as an example below for description. For details, refer to FIG. 4. FIG. 4 is another schematic diagram of an application scenario according to an embodiment of this application.

For example, the computing device is a server that includes an acorn reduced instruction set machine (acorn RISC machine, ARM) CPU. Because a hardware unit such as an IMU or an ME that is independent of a main CPU is integrated into the ARM CPU, the IMU or the ME may obtain threshold data and perform storm suppression timing, and the BIOS can obtain threshold data from the IMU or the ME, determine a CE storm, and perform CE storm suppression and releasing. A specific implementation process shown in FIG. 4 is as follows:

401: An IMU obtains threshold data.

For example, the user may input threshold data (x, y, z, and/or w) into the IMU through a serial port of the user, and a specific value of the threshold data (x, y, z, and/or w) may be modified by the user in real time by using a serial port of the IMU after being determined based on an application environment. It may be understood that a value of the threshold data in each application environment may be determined based on an actual situation. This is not specifically limited herein.

In addition, the IMU may further adjust the threshold data based on current tolerance of the computing device to the CE storm, for example, dynamically adjust the threshold value based on the occupation rate of the CPU described in FIG. 2, and dynamically adjust the threshold data based on a change in a requirement of the fault diagnosis system (that is, the BMC or the OS) for obtaining CE fault information. Specific implementation is similar to that described in FIG. 2. Details are not described herein again.

In one embodiment of this application, the user may adjust the threshold data based on tolerance of a system of the computing device to the CE storm, or the BMC dynamically changes the threshold data based on a change in a requirement of the fault diagnosis system for obtaining CE fault information, so that this solution is applicable to a plurality of application scenarios.

402: A CE fault occurs in a hardware structure.

When the hardware structure detects that the CE fault occurs in the hardware structure, the hardware structure repairs the CE fault, and performs the following operation 403 to send a CE interruption to the BIOS.

403: The hardware structure sends a CE interruption to the BIOS.

404: The BIOS obtains threshold data from the IMU.

405: The BIOS determines a CE storm.

406: The BIOS performs CE storm suppression.

407: The BIOS reports a suppression event to the BMC.

Specifically, when performing CE storm suppression, the BIOS further reports start of the CE storm suppression to the BMC, so that the BMC performs the following operation 408:

408: The IMU performs suppression timing.

Specifically, after the IMU receives the suppression event reported by the BIOS, the IMU starts suppression timing based on stored threshold data z.

409: The BMC delivers a CE storm suppression release task.

410: The BIOS performs CE storm suppression releasing.

It should be noted that a specific implementation process of operation 402 to operation 410 is similar to that of operation 302 to operation 310 in FIG. 3. Details are not described herein again.

It should be noted that FIG. 3 and FIG. 4 are merely examples of the application scenario for understanding the embodiments of this application, and do not constitute a substantial limitation on the embodiments of this application. It may be understood that, in an actual case, an operation on a BIOS side may alternatively be implemented by the BMC, the OS, or the like, or the independent processing unit may be a unit such as the BMC, the IMU, or the ME. This is not specifically limited herein.

The processing method for reporting a hardware fault provided in the embodiments of this application is described in detail above. In this specification, a specific example is used to describe a principle and an implementation of the embodiments of this application. The foregoing descriptions of the embodiments are merely used to help understand the processing method for reporting a hardware fault in the embodiments of this application and a core idea of the method. In addition, a person of ordinary skill in the art may change a specific implementation and an application scope according to the idea of the embodiments of this application. In conclusion, content of this specification should not be construed as a limitation on the embodiments of this application.

In addition, functional modules or units in the embodiments of this application may be integrated into one processor, and the integrated modules or units may be implemented in a form of hardware or in a form of a software function module.

An embodiment of this application further provides a computer-readable storage medium, including computer-readable instructions. When the computer-readable instructions are run on a computer, the computer is enabled to perform any implementation shown in the foregoing method embodiments.

An embodiment of this application further provides a computer program product. The computer program product includes a computer program or instructions. When the computer program or the instructions are run on a computer, the computer is enabled to perform any implementation shown in the foregoing method embodiments.

An embodiment of this application further provides a chip or a chip system, and the chip may include a processor. The chip may further include a memory (or a storage module) and/or a transceiver (or a communication module), or the chip is coupled to a memory (or a storage module) and/or a transceiver (or a communication module). The transceiver (or the communication module) may be configured to support the chip in performing wired and/or wireless communication. The memory (or the storage module) may be configured to store a program or a group of instructions. The processor may invoke the program or the group of instructions to implement an operation performed by a terminal or a network device in the method embodiments or any possible implementation of the method embodiments. The chip system may include the foregoing chip, or may include the foregoing chip and another separate device such as the memory (or the storage module) and/or the transceiver (or the communication module).

In addition, it should be noted that the described apparatus embodiment is merely an example. The units described as separate parts may or may not be physically separate, and parts displayed as units may or may not be physical units, may be located in one place, or may be distributed on a plurality of units. Some or all of the modules may be selected according to an actual requirement to implement the objectives of the solutions in the embodiments. In addition, in the accompanying drawings of the apparatus embodiment provided in the embodiments of this application, a connection relationship between modules indicates that there is a communication connection between the modules, which may be specifically implemented as one or more communication buses or signal lines.

According to the descriptions of the foregoing embodiments, a person skilled in the art may clearly understand that the embodiments of this application may be implemented by using software plus indispensable universal hardware, and certainly may also be implemented by using dedicated hardware including a dedicated integrated circuit, a dedicated CPU, a dedicated memory, a dedicated component, and the like. Generally, any function completed by a computer program may be easily implemented by using corresponding hardware. In addition, diverse specific hardware structures may also be used to implement a same function, for example, an analog circuit, a digital circuit, or a dedicated circuit. However, in most cases, software program implementation is a better implementation for the embodiments of this application. Based on such an understanding, the technical solutions of the embodiments of this application essentially or the part contributing to the conventional technology may be embodied in a form of a software product. The computer software product is stored in a readable storage medium, such as a floppy disk, a USB flash drive, a removable hard disk, a read only memory (ROM), a random access memory (RAM), a magnetic disk, or an optical disc of a computer, and includes several instructions for instructing a computer device (which may be a personal computer, a training device, a network device, or the like) to perform the methods in the embodiments of this application.

What is claimed is:

1. A method of reporting a hardware fault, comprising:

obtaining, by a computing device, at least a first threshold and a second threshold by using an algorithm of an independent processing unit, wherein the first threshold and the second threshold are stored in the independent processing unit, wherein the obtaining, by the computing device, the at least the first threshold and the second threshold by using the algorithm of the independent processing unit comprises:

determining, by the computing device, the first threshold and the second threshold in real time based on an occupation rate of a central processing unit (CPU) by using the algorithm of the independent processing unit;

obtaining, by the computing device, a third threshold by using the algorithm of the independent processing unit, wherein the third threshold is stored in the independent processing unit, wherein the obtaining, by the computing device, the third threshold by using the algorithm of the independent processing unit comprises:

determining, by the computing device, the third threshold based on a capability requirement of a fault diagnosis system by using the algorithm of the independent processing unit;

determining, by the computing device based on the first threshold, that consecutive correctable errors (CEs) occur;

counting, by the computing device, a quantity of the consecutive CEs; and stopping, by the computing device, a reporting of a CE interruption based on the quantity of the consecutive CEs and the second threshold, wherein the CE interruption is used to advertise an occurrence of an CE; and continuing, by the computing device, to report the CE interruption based on the third threshold and a duration for which the reporting of the CE interruption is stopped.

2. The method according to claim 1, further comprising:

obtaining, by the computing device, a fourth threshold by using the algorithm of the independent processing unit, wherein the fourth threshold is stored in the independent processing unit; and after the continuing, by the computing device, to report the CE interruption based on the third threshold and the duration for which the reporting of the CE interruption is stopped, the method further comprises:

counting, by the computing device, a target quantity of times, wherein the target quantity of times is a quantity of times of resuming the reporting of the CE interruption after the reporting of the CE interruption is stopped; and permanently prohibiting, by the computing device, the reporting of the CE interruption based on the target quantity of times and the fourth threshold.

3. The method according to claim 1, wherein the determining, by the computing device based on the first threshold, that consecutive CEs occur comprises:

determining, by the computing device based on the first threshold by using a basic input output system (BIOS), that consecutive CEs occur; and the stopping, by the computing device, the reporting of the CE interruption based on the quantity of the consecutive CEs and the second threshold comprises:

stopping, by the computing device, the reporting of the CE interruption based on the quantity of the consecutive CEs and the second threshold by using the BIOS.

4. The method according to claim 1, wherein the determining, by the computing device based on the first threshold, that the consecutive CEs occur comprises:

determining, by the computing device based on the first threshold by using a baseboard management controller (BMC) or an operating system (OS), that consecutive CEs occur; and the stopping, by the computing device, the reporting of the CE interruption based on the quantity of the consecutive CEs and the second threshold comprises:

stopping, by the computing device, the reporting of the CE interruption based on the quantity of consecutive CEs and the second threshold by using the BMC or the OS.

5. The method according to claim 1, wherein the independent processing unit is any one of:

an intelligent management unit (IMU), a management engine (ME), a BMC, or an OS.

6. A computing device, comprising:

a central processing unit (CPU) configured to store a basic input output system (BIOS); and an independent processing unit configured to;

obtain at least a first threshold and a second threshold by using an algorithm, wherein the first threshold and the second threshold are stored in the independent processing unit, wherein, to obtain the at least the first threshold and the second threshold by using the algorithm of the independent processing unit, the independent processing unit is configured to:

determine the first threshold and the second threshold in real time based on an occupation rate of a central processing unit (CPU) by using the algorithm of the independent processing unit;

obtain a third threshold by using the algorithm of the independent processing unit, wherein the third threshold is stored in the independent processing unit, wherein, to obtain the third threshold by using the algorithm of the independent processing unit, the independent processing unit is configured to:

determine the third threshold based on a capability requirement of a fault diagnosis system by using the algorithm of the independent processing unit;

the BIOS is configured to:

determine, based on the first threshold, that consecutive correctable errors (CEs) occur;

count a quantity of the consecutive CEs; and stop a reporting of a CE interruption based on the quantity of the consecutive CEs and the second threshold, wherein the CE interruption is used to advertise an occurrence of an CE; and the independent processing unit is further configured to:

resume the reporting of the CE interruption based on the third threshold and a duration for which the reporting of the CE interruption is stopped.

7. The computing device according to claim 6, wherein the independent processing unit is further configured to obtain a fourth threshold by using the algorithm, and the fourth threshold is stored in the independent processing unit;

the independent processing unit is further configured to count a target quantity of times, wherein the target quantity of times is a quantity of times of resuming the reporting of the CE interruption after the reporting of the CE interruption is stopped; and the independent processing unit is further configured to permanently prohibit the reporting of the CE interruption based on the target quantity of times and the fourth threshold.

8. A computing device, comprising:

a central processing unit (CPU);

an independent processing unit configured to:

obtain at least a first threshold and a second threshold by using an algorithm, wherein the first threshold and the second threshold are stored in the independent processing unit, wherein, to obtain the at least the first threshold and the second threshold by using the algorithm of the independent processing unit, the independent processing unit is configured to:

determine the first threshold and the second threshold in real time based on an occupation rate of a central processing unit (CPU) by using the algorithm of the independent processing unit;

obtain a third threshold by using the algorithm of the independent processing unit, wherein the third threshold is stored in the independent processing unit, wherein, to obtain the third threshold by using the algorithm of the independent processing unit, the independent processing unit is configured to:

determine the third threshold based on a capability requirement of a fault diagnosis system by using the algorithm of the independent processing unit; and a storage chip configured to store a basic input output system (BIOS) or a baseboard management controller (BMC) chip, wherein the CPU is configured to run the BIOS;

the BIOS or the BMC chip is configured to:

determine, based on the first threshold, that consecutive correctable errors CEs occur;

count a quantity of the consecutive CEs; and stop a reporting of a CE interruption based on the quantity of the consecutive CEs and the second threshold, wherein the CE interruption is used to advertise an occurrence of an CE; and the independent processing unit is further configured to:

resume the reporting of the CE interruption based on the third threshold and a duration for which the reporting of the CE interruption is stopped.

9. The computing device according to claim 8, wherein the independent processing unit is further configured to obtain a fourth threshold by using the algorithm, and the fourth threshold is stored in the independent processing unit;

the independent processing unit is further configured to count a target quantity of times, wherein the target quantity of times is a quantity of times of resuming the reporting of the CE interruption after the reporting of the CE interruption is stopped; and the independent processing unit is further configured to permanently prohibit the reporting of the CE interruption based on the target quantity of times and the fourth threshold.

10. The computing device according to claim 8, wherein, to determining, based on the first threshold, that consecutive CEs occur, the BIOS or the BMC chip is configured to:

determine, based on the first threshold by using the BIOS, the BMC, or an operating system (OS), that consecutive CEs occur; and wherein, to stop the reporting of the CE interruption based on the quantity of the consecutive CEs and the second threshold, the BIOS or the BMC chip is configured to:

stop the reporting of the CE interruption based on the quantity of the consecutive CEs and the second threshold by using the BIOS, the BMC or the OS.

11. The computing device according to claim 8, wherein the independent processing unit is any one of:

an intelligent management unit (IMU), a management engine (ME), a BMC, or an OS.

* * * * *